(12) United States Patent
Melnychuk

(10) Patent No.: US 12,253,424 B2
(45) Date of Patent: Mar. 18, 2025

(54) HIGH DENSITY THERMISTOR CABLE

(71) Applicant: Precise Downhole Services Ltd., Nisku (CA)

(72) Inventor: Michael Melnychuk, Nisku (CA)

(73) Assignee: PRECISE DOWNHOLE SERVICES LTD.

( * ) Notice: Subject to any disclaimer, the term of this patent is extended or adjusted under 35 U.S.C. 154(b) by 852 days.

(21) Appl. No.: 17/110,083

(22) Filed: Dec. 2, 2020

(65) Prior Publication Data

US 2021/0164847 A1 Jun. 3, 2021

Related U.S. Application Data

(60) Provisional application No. 62/943,095, filed on Dec. 3, 2019.

(51) Int. Cl.
| | | |
|---|---|---|
| *G01K 7/22* | (2006.01) | |
| *G01K 1/08* | (2021.01) | |
| *H01B 7/00* | (2006.01) | |
| *H01B 13/00* | (2006.01) | |
| *H01B 13/06* | (2006.01) | |

(52) U.S. Cl.
CPC ............... *G01K 7/22* (2013.01); *G01K 1/08* (2013.01); *H01B 7/0054* (2013.01); *H01B 13/00* (2013.01); *H01B 13/062* (2013.01)

(58) Field of Classification Search
CPC .......... G01K 7/22; G01K 1/08; H01B 7/0054; H01B 13/00; H01B 13/062
See application file for complete search history.

(56) References Cited

U.S. PATENT DOCUMENTS

| | | | |
|---|---|---|---|
| 661,326 A | 11/1900 | Spates | |
| 2,665,322 A | 1/1954 | MacDonald | |
| 2,792,481 A * | 5/1957 | Wood | H01B 7/0054 |
| | | | 338/214 |
| 3,396,357 A * | 8/1968 | Borg | H02G 15/14 |
| | | | 29/613 |
| 3,619,844 A | 11/1971 | Collins et al. | |
| 3,716,417 A | 2/1973 | Evans | |
| 4,385,197 A | 5/1983 | Schwagerman | |
| 4,408,088 A | 10/1983 | Foote | |
| 4,801,501 A | 1/1989 | Harlow | |

(Continued)

FOREIGN PATENT DOCUMENTS

| | | |
|---|---|---|
| CA | 2695608 | 7/2014 |
| CA | 3031478 | 7/2020 |

(Continued)

OTHER PUBLICATIONS

Penny et al, A New Approach to Thermal Profiling in High Temperature Reservoirs Based on Advanced, Polymeric Insulated Thermocouples to Increase Measurement Point Density, paper, Nov. 23-25, 2015, 1-17, Society of Petroleum Engineers, Canada.

*Primary Examiner* — Kyung S Lee
(74) *Attorney, Agent, or Firm* — Bennett Jones LLP

(57) ABSTRACT

A thermistor cable is formed from a tubing and a plurality of thermistor conductors bundled within the tubing, wherein each thermistor conductor forms a junction with a shared thermistor conductor to form a thermistor junction, and each thermistor junction is attached to a support cable in a thermistor bundle. The cable is formed by pulling the thermistor bundle into the tubing.

8 Claims, 6 Drawing Sheets

(56) References Cited

U.S. PATENT DOCUMENTS

| | | | |
|---|---|---|---|
| 5,121,994 A | 6/1992 | Molitoris | |
| 5,220,130 A | 6/1993 | Walters | |
| 5,457,841 A | 10/1995 | Minton | |
| 5,464,308 A | 11/1995 | Missout | |
| 5,499,797 A | 3/1996 | Sano et al. | |
| 5,699,996 A | 12/1997 | Boyle et al. | |
| 6,180,889 B1 | 1/2001 | Bul | |
| 6,613,261 B2 | 9/2003 | Knapp | |
| 6,780,360 B2 | 8/2004 | Ange et al. | |
| 7,225,533 B2 | 6/2007 | Sylvia et al. | |
| 7,290,601 B2 | 11/2007 | Chalifoux et al. | |
| 7,714,231 B2 | 5/2010 | Varkey et al. | |
| 7,736,052 B2 * | 6/2010 | Shumaker | G01K 1/026 374/170 |
| 8,353,347 B2 | 1/2013 | Mason | |
| 8,530,746 B2 | 9/2013 | Zheng et al. | |
| 10,935,746 B2 | 3/2021 | Melnychuk et al. | |
| 2004/0065444 A1 | 4/2004 | Smith et al. | |
| 2004/0238023 A1 | 12/2004 | Richetto | |
| 2005/0236161 A1 | 10/2005 | Gay et al. | |
| 2007/0227741 A1 | 10/2007 | Lovell et al. | |
| 2008/0245536 A1 | 10/2008 | Stoesz | |
| 2010/0148138 A1 | 6/2010 | Baker et al. | |
| 2011/0224907 A1 | 9/2011 | Chalifoux | |
| 2014/0060606 A1 | 3/2014 | Smith et al. | |
| 2014/0196930 A1 | 7/2014 | Bree et al. | |
| 2020/0240260 A1 | 7/2020 | Melnychuk | |
| 2021/0164847 A1 | 6/2021 | Melnychuk | |

FOREIGN PATENT DOCUMENTS

| | | |
|---|---|---|
| CN | 104730671 | 6/2015 |
| EP | 0681353 | 11/1995 |
| EP | 1324090 | 7/2003 |
| FI | 28487 | 7/1956 |
| GB | 874650 | 8/1961 |
| JP | S5729013 | 2/1982 |
| KR | 100839462 | 6/2008 |
| LU | 81062 | 10/1980 |

* cited by examiner

HIGH DENSITY THERMISTOR CABLE

CROSS-REFERENCE TO RELATED APPLICATION

The present application claims the priority benefit of U.S. Provisional Patent Application No. 62/943,095, filed on Dec. 3, 2019, the entire contents of which are incorporated herein by reference.

FIELD OF THE INVENTION

The present invention relates to a high density thermistor cable and methods of manufacturing the same.

BACKGROUND

Standard thermistors and resistance temperature detectors (RTDs) are resistance temperature measurement types and are used in a wide range of applications. Typically, standard thermistors are suitable for use in very low (cryogenic) temperatures to about 150° C. With improved materials, some thermistors are capable of withstanding temperature of up to about 500° C., but at these temperatures long term stability becomes a concern. RTDs are more costly, but are capable of withstanding temperatures up to 850° C. With the progression of technology there is a continued push to design high density temperature sensing strings, using a plurality of thermistors or RTDs.

Thermistor strings including multiple thermistors along its length are known to measure temperature profiles in a downhole environment, such as an oil and gas well. Each thermistor must be insulated along its length. Polymer insulated thermistors are widely used, particularly for lower temperature installations, but typically provide a limited number of discrete temperature sensing points.

Long thermistor strings or cables having a large number of thermistors are known. These strings are capable of measuring temperature at multiple points along the cable. The cable comprises a large number of thermistors at spaced junctions with a shared conductor, installed in a capillary tubing. However, conventional methods of forming such long strings result in a large number of failed connections, due at least in part to wire twisting, insulation damage and breakages.

Therefore, there is a need in the art for a thermistor cable which may mitigate the disadvantages of the prior art, together with methods of making such cable.

SUMMARY OF THE INVENTION

In one aspect, the invention comprises a high density thermistor cable comprising a tubing and a plurality of thermistors bundled within the tubing, wherein each thermistor conductor forms a junction with a shared conductor wire to form a thermistor junction, and each thermistor junction is attached to a support cable. Preferably, the support cable runs at least the length between all thermistor junctions and is attached to each thermistor junction. Optionally, the tubing may be filled with a matrix which embeds the bundle of thermistor conductor.

In another aspect, the invention may comprise method of manufacturing a thermistor cable, comprising the steps of:
(a) inserting a pull line into a hot end of a tubing until it emerges from a cold end of the tubing;
(b) forming a first thermistor junction comprising a first thermistor conductor connected to a shared thermistor conductor, wherein the first thermistor junction is attached to a support cable in a first thermistor bundle;
(c) attaching the support cable to the pull line and pulling the first thermistor bundle into the tubing using the pull line;
(d) forming a second thermistor junction comprising a second thermistor conductor connected to a shared thermistor conductor, wherein the second thermistor junction is attached to the support cable in a second thermistor bundle;
(c) attaching the support cable to the pull line and pulling the second thermistor bundle into the tubing using the pull line;
(e) pulling the first thermistor bundle through to the hot end of the tubing; and
(f) optionally filling the tubing with a matrix.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 2:
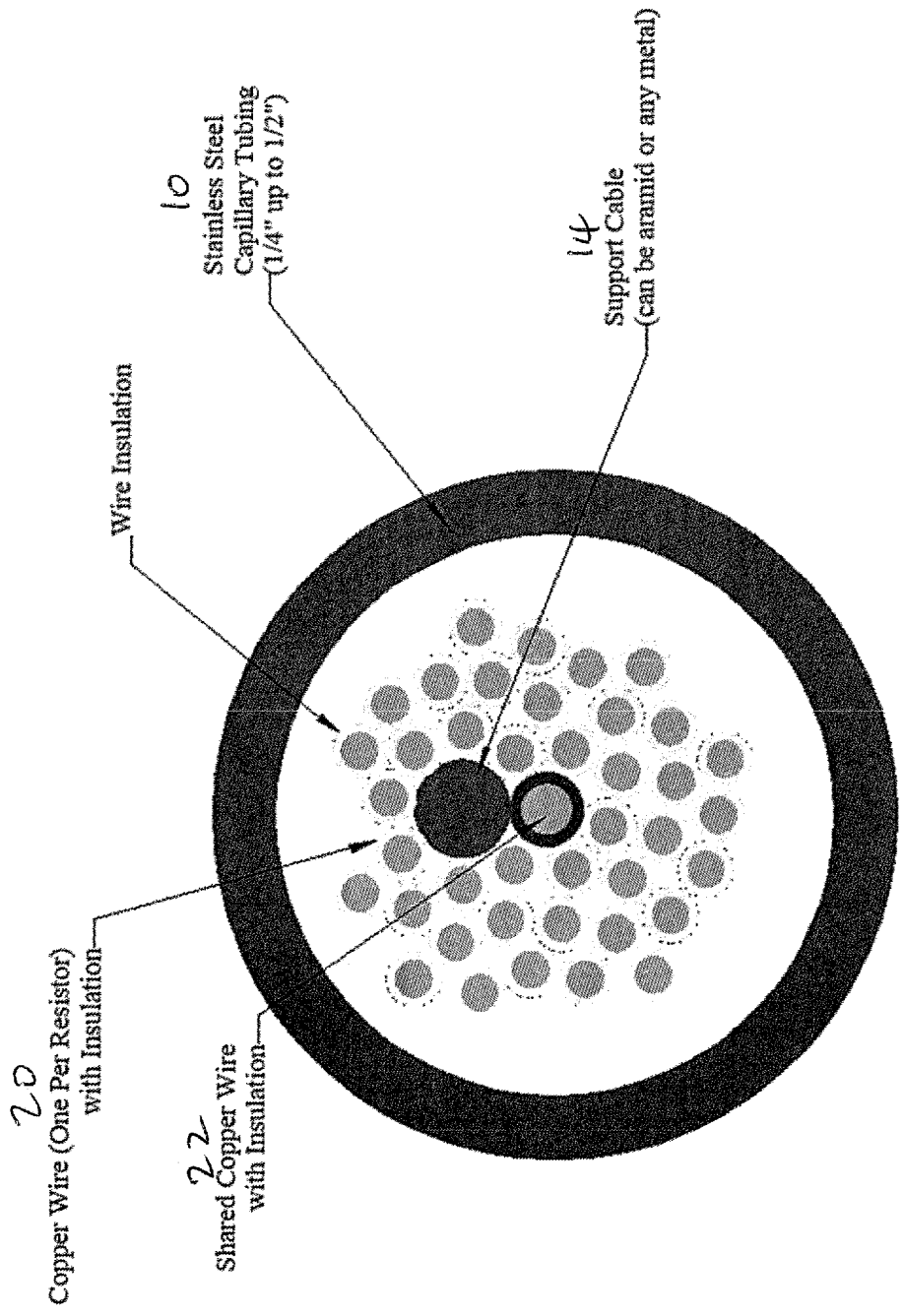
FIG. 2 shows a cross-sectional view of the cable of FIG. 1.

In one aspect of the invention, the invention comprises a thermistor cable comprising a tubing (10) and a plurality of thermistor conductors (20) bundled within the tubing, wherein each thermistor conductor forms a junction (30) with a shared thermistor conductor (22), and each thermistor junction is attached to a backbone support cable (14). Optionally, the tubing may be filled with a matrix which embeds the bundle of thermistor conductors. A cross-section of an assembled cable is shown in FIG. 2. As may be seen, a large number of thermistor conductors can be housed in the tubing, which may be any size, such as in the range of between ¼" and ½" tubing.

As used herein, the term "thermistor" shall mean any resistor whose resistance varies with temperature, and the change in resistance is measurable to determine temperature. Thermistors include "resistance temperature detectors" (RTDs), any resistors specifically designed and marketed as thermistors, or any standard resistors. Thermistors can have either a negative temperature coefficient (NTC) or a positive temperature coefficient (PTC). NTCs have resistance that decreases with increasing temperature while PTCs exhibit increased resistance with increasing temperature.

RTDs are considered a specific form of passive temperature sensor which operates on the principle of changes in electrical resistance of pure metals, and are characterized by a linear positive change in resistance with changing temperature. RTDs may be specified in some applications as they have some different properties than standard thermistors.

As used herein, the "hot end" is the end of the thermistor cable which is intended to be installed downhole, whereas the "cold end" is the end which remains at the surface and is connected to a data collection system which reads the thermistor readings. The surface data collection system is not part of this invention. The hot and cold ends are identified to designate the orientation of the cable, and not to designate any temperature limitations at either end, or relative to one another.

Figure 1:
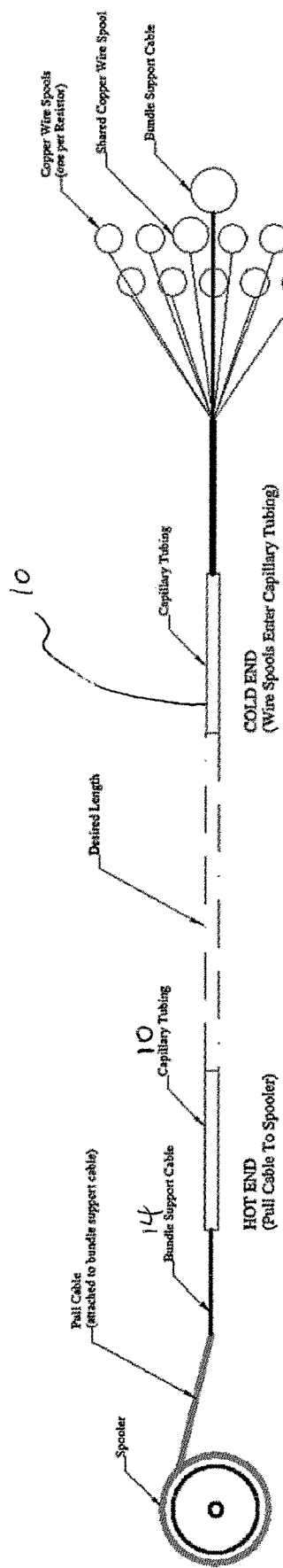
FIG. 1 shows a schematic representation of a thermistor cable assembled in accordance with one example of the present invention.

The thermistor cable may be formed by first providing the required or desired length of capillary tubing (10), which may be hundreds or thousands of meters. A pull line (12), such as a stainless steel wire (or equivalent), is blown in from the hot end (10A) of the cable towards the cold end using an insertion pig (not shown). The pull line (12) does not form part of the final product, but is used to assemble the final product. When the pull line (12) emerges from the cold end (10B), it is connected to a support cable (14) which will eventually run substantially the entire length of the tubing (10). FIG. 1 shows the cable near completion of its assembly, after the support cable and the plurality of thermistor junctions have been pulled through the tubing.

Preferably, the support cable (14) comprises a suitable high tensile and high temperature material, which may comprise high-strength steel wire or an aramid fiber cable. It is preferred that the support cable (14) resist significant stretching during the assembly process. In preferred embodiments, the support cable has a test strength of at least about 200 lbs, and preferably higher. However, for relatively shorter lengths, less robust cables may be suitable.

Because the thermistor cable is generally not intended to be used in high-temperature applications (greater than about 300° C.), high-temperature materials need not necessarily be used. However, in embodiments where high-temperature thermistors or RTDs are implemented, the support cable (14) material may be chosen accordingly.

In an alternative embodiment, the support cable (14) may be replaced by a sufficiently strong shared conductor wire (22), which would serve the dual purpose of providing a physical backbone to the assembly, and be the shared electrical conductor. The shared conductor wire (22) may comprise a copper wire with an insulating coat that may be reinforced to provide it with sufficient physical strength to act as the support cable (14).

Figure 3:
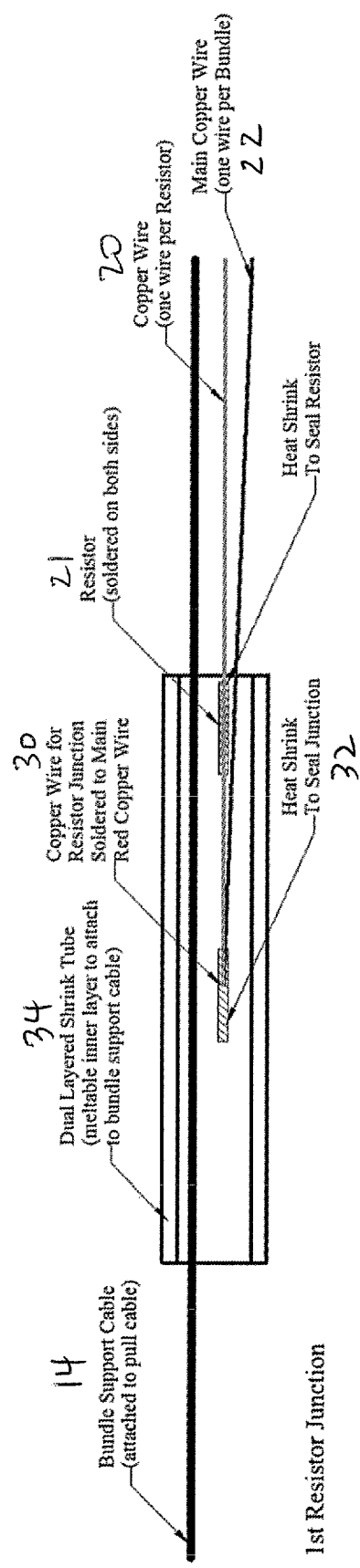
FIG. 3 is a schematic view of the formation of the first thermistor (TR) point.
Figure 4:
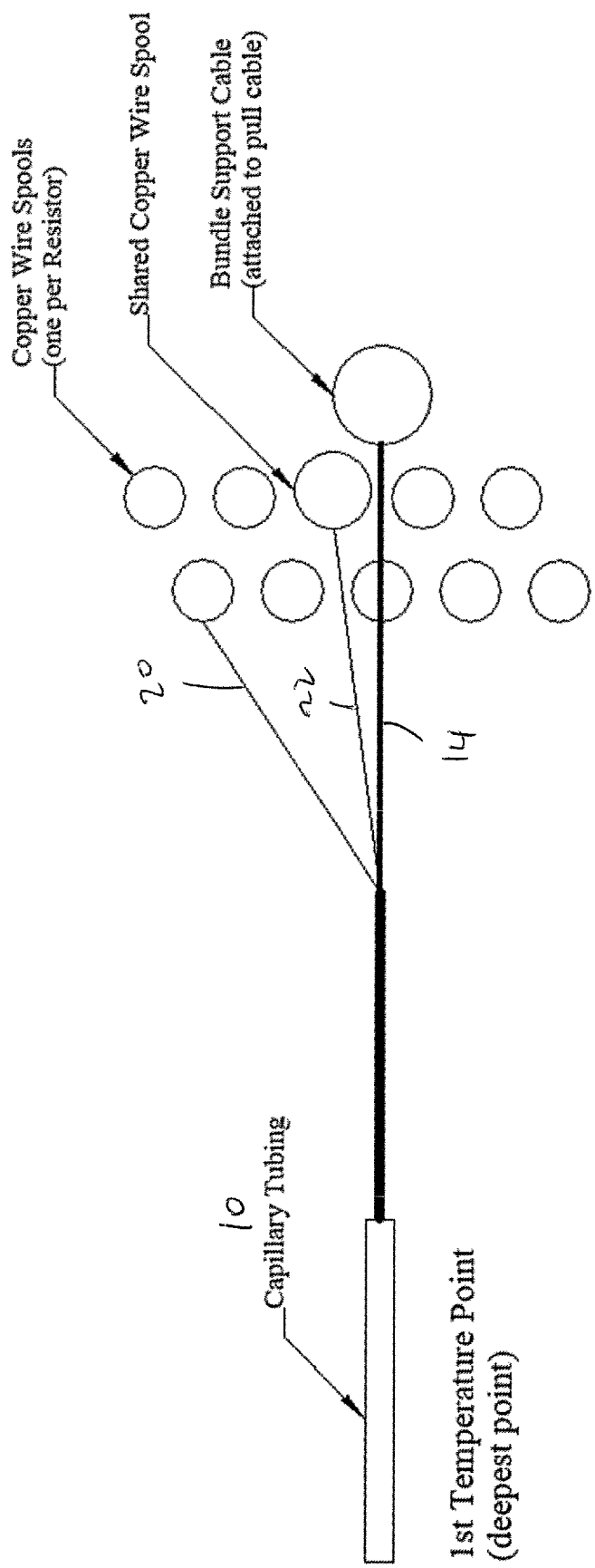
FIG. 4 is a schematic view of the wire spools used to form the first thermistor junction.

As shown in FIG. 3, a first thermistor conductor (20) is connected to the shared conductor wire (22) to make the first thermistor (TR) junction (30), using any conventional method, such as a twisting and solder junction connection as is well known in the art. A heat shrink cover (32) may be placed over the junction to seal it from moisture. The thermistor itself is soldered inline with the thermistor conductor (20).

The thermistor conductors, including the shared conductor wire, must be electrically insulated for the length of the cable. In preferred embodiments, the conductors may be insulated with a polymer (24) which is dielectric, preferably non-hygroscopic. The polymer may be selected with operational temperature in mind. Polymers rated for low temperature use (about 150° C.) such as fluorinated ethylene propylene (FEP) may be suitable. Although thermistors are generally not used at high temperatures (>300° C.), it is possible to use materials with a melting point above about 200°, more preferably 250° and most preferably 300° C., One particularly suitable material may comprise ECA 3000™ fluoropolymer resin (DuPont™). Perfluoroalkoxy (PFA) alkane copolymers of tetrafluoroethylene (TFE) and perfluoroethers may be suitable. PFAs also have a high melting point (up to 315° C.) but, unlike PTFE, may be melt-processed or melt-extrudable.

The first TR junction (30) is then secured to the support cable (14) in a suitable manner, such as by another heat shrink sleeve (34), which provides a secure physical connection between the TR junction (30) and the support cable (14). Preferably, the heat shrink sleeve (34) is a dual layer sleeve, which comprises a solid outer layer (36) and a meltable or adhesive inner layer (38). Preferably, the heat shrink sleeve (34) comprises fluoropolymers, but the inner layer may be a simple adhesive liner.

Figure 5:
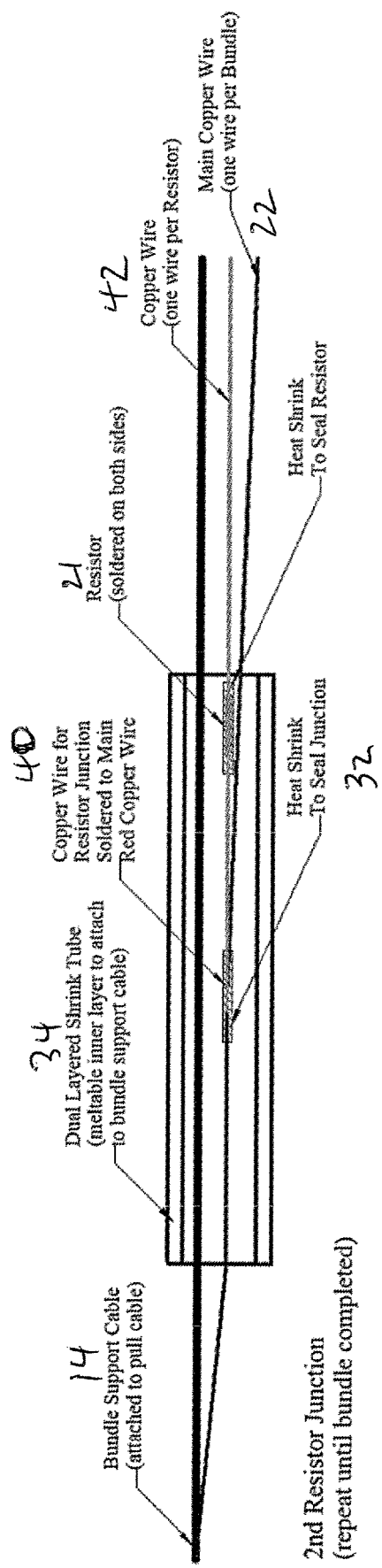
FIG. 5 is a schematic view of the formation of the second and subsequent thermistor (TR) points.

The first TR junction (30) and support cable (14) is then pulled into the tubing (10) until the second TR junction interval which may be, for example, 1 meter to 10 meters. As shown in FIG. 5, a second thermistor and thermistor conductor (42) is connected to the shared thermistor conductor (22) to form a second TR junction (40), and secured to the support cable (14) by a heat shrink sleeve (34), in like manner to the first TR junction (30).

Figure 6:
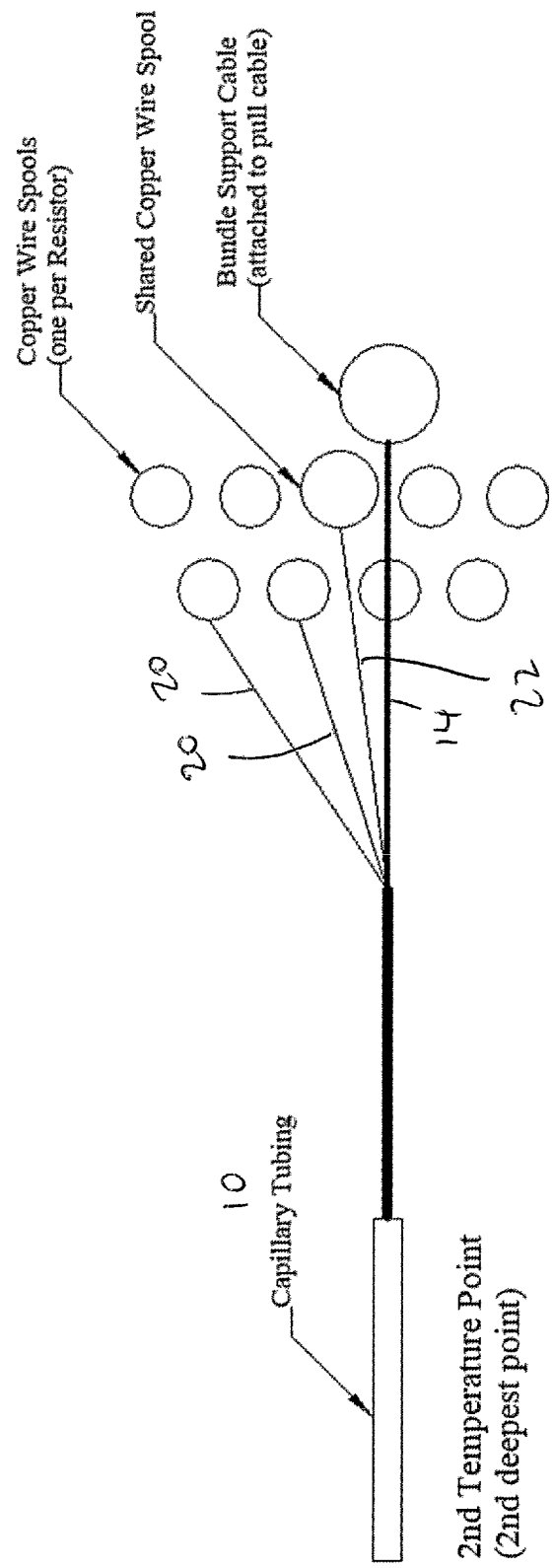
FIG. 6 is a schematic view of the wire spools used to form the second thermistor junction.

At this point, the bundle consists of the support cable, the shared thermistor conductor, and the first and second thermistor conductors, as shown in FIG. 6. The process is then repeated for as many TR junctions as are desired, which may be dozens or even hundreds.

Once all of the TR junctions are formed, the support cable (14) may be cut (at the cold end) and the thermistor bundles may be pulled all the way such that the first TR junction (30) is at least adjacent the hot end. The support cable (114) is buried in the tubing and connects all the TR junctions, but is not required between the last TR junction and the cold end.

The support cable (14) thus forms the backbone of the thermistor string as it is securely connected to all of the thermistor conductors. As the TR junctions are pulled into the tubing one-by-one, it is not necessary to make a large number of points from the beginning. During assembly, the thermistor bundle is kept in constant tension as the support cable (14) is attached to each wire and prevents any wire from turning around on itself due to any twisting effects.

In one embodiment, each thermistor conductor wire may be colour coded to ensure correct identification and depth verification.

A thermistor cable may be installed in a well having a surface blowout preventer (BOP) assembly. Conventional mineral insulated thermistors require multiple cables to be banded or crimped together. This results in void spaces and non-uniform profile which prevents the BOP assembly from creating a seal during installation. The thermistor cable of the present invention presents a single uniform outside diameter (the tubing) while still including a large number of TR junctions. This permits effective sealing and well control during installation with BOP equipment.

Aspects

The following is a description of more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1. A thermistor cable comprises a tubing and a plurality of thermistor conductors bundled within the tubing, wherein each thermistor conductor forms a junction with a shared thermistor conductor to form a thermistor junction, spaced apart from other thermistor junctions, and each thermistor junction is attached to a support cable in a thermistor bundle.

Aspect 2. The cable of Aspect 1 wherein the support cable runs at least the length between all thermistor junctions and is attached to each junction.

Aspect 3. The cable of Aspect 1 or 2 wherein the support cable comprises aramid fibers or a metal cable.

Aspect 4. The cable of any one of Aspect 1-3, wherein the each thermistor junction is encased in a moisture resistant sleeve.

Aspect 5. The cable of any one of Aspect 1-4 wherein the each thermistor bundle comprises a heat shrink sleeve.

Aspect 6. The cable of Aspect 5 wherein the heat shrink comprises a meltable or adhesive inner liner.

Aspect 7. The cable of any one of Aspect 1-6 wherein each thermistor conductor is insulated with a dielectric polymer.

Aspect 8. The cable of any one of Aspect 1-7 wherein the tubing is filled with a matrix which embeds the entire bundle of thermistor conductors, points and bundles.

Aspect 9. A method of manufacturing a thermistor cable having at least two thermistors, comprising the steps of:
 (a) inserting a pull line into a hot end of a tubing;
 (b) forming a first thermistor junction comprising a first thermistor and first thermistor conductor connected to a shared thermistor conductor, wherein the first thermistor junction is attached to a support cable in a first thermistor bundle;
 (c) attaching the support cable to the pull line and pulling the first thermistor bundle into the tubing using the pull line;
 (d) forming a second thermistor junction comprising a second thermistor and second thermistor conductor connected to a shared thermistor conductor, wherein the second thermistor junction is attached to the support cable in a second thermistor bundle; and
 (e) pulling the first and second thermistor bundles through towards the hot end of the tubing.

Aspect 10. The method of Aspect 9 wherein steps of forming a thermistor junction and thermistor bundle and pulling into the cable are repeated, until all thermistor junctions and bundles have been formed and pulled into the tubing.

Aspect 11. The method of Aspect 9 wherein the support cable runs at least the length between all thermistor junctions and is attached to each point.

Aspect 12. The method of Aspect 9 wherein the shared thermistor conductor is the support cable.

Aspect 13. The method of Aspect 9, 10, or 11 wherein the support cable comprises braided aramid fibers.

Aspect 14. The method of any one of Aspect 9-13, wherein the each thermistor junction is encased in a moisture resistant sleeve.

Aspect 15. The method of any one of Aspect 9-14 wherein the each thermistor bundle comprises a heat shrink sleeve.

Aspect 16. The method of Aspect 15 wherein the heat shrink sleeve has a meltable or adhesive inner layer.

Aspect 17. The method of any one of Aspect 9-16 comprising the further step of filling the tubing with a matrix which embeds the entire bundle of thermistor conductors, points and bundles.

Aspect 18. The system or method of any Aspect above, wherein the thermistor is an RTD.

Aspect 19. The system or method of any Aspect above, comprising any combination of features or elements described herein.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically.

References in the specification to "one embodiment", "an embodiment", eTR., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

What is claimed is:

1. A thermistor cable comprises a tubing and a plurality of thermistor conductors bundled within the tubing, wherein each thermistor conductor forms a separate junction with a shared thermistor conductor to form a corresponding thermistor junction, and forming a plurality of thermistor junctions spaced apart from each other,
   wherein each thermistor junction, of the plurality of thermistor junctions, includes the shared thermistor conductor, and each thermistor junction is attached to a common support cable in a thermistor bundle.

2. The cable of claim 1, wherein the support cable runs at least the length between all thermistor junctions and is attached to each junction.

3. The cable of claim 1, wherein the support cable comprises aramid fibers or a metal cable.

4. The cable of claim 1, wherein the each thermistor junction is encased in a moisture resistant sleeve.

5. The cable of claim 1, wherein the each thermistor bundle comprises a heat shrink sleeve.

6. The cable of claim 5, wherein the heat shrink comprises a meltable or adhesive inner liner.

7. The cable of claim 1, wherein each thermistor conductor is insulated with a dielectric polymer.

8. The cable of claim 1, wherein the tubing is filled with a matrix which embeds the entire bundle of thermistor conductors, points and bundles.

* * * * *